United States Patent [19]
Trahan

[11] 3,803,922
[45] Apr. 16, 1974

[54] ADJUSTABLE BALL BEARING ASSEMBLY FOR DYNAMIC BALANCING MACHINES

[76] Inventor: Albert J. Trahan, 1717 Fifth St., Lake Charles, La. 70601

[22] Filed: Dec. 1, 1972

[21] Appl. No.: 311,108

[52] U.S. Cl. .................................. 73/471, 73/478
[51] Int. Cl. ........................................... G01m 1/04
[58] Field of Search ............ 73/460, 471, 478, 487, 73/475–477

[56] References Cited
UNITED STATES PATENTS

| | | | |
|---|---|---|---|
| 1,347,316 | 7/1920 | Akimoff | 73/475 |
| 3,121,335 | 2/1964 | Ongaro | 73/460 |
| 2,090,803 | 8/1937 | Moore | 73/478 X |
| 3,090,237 | 5/1963 | Ongaro | 73/487 X |

Primary Examiner—James J. Gill
Attorney, Agent, or Firm—Berman, Bishoff & Platt

[57] ABSTRACT

A shaft bearing assembly for dynamic balancing machines. The assembly has opposing pivoted arms provided with rollers at their top ends adapted to support a rotating shaft associated with the unit under test. The pivoted arms are provided with arcuate slots through which headed clamping screws extend to clamp the arms in adjusted positions. Respective stationary indicating pointers are provided, extending from the pivot connections of the arms through the clamping bolts, and associated movable arcuate scales are provided on the arms adjacent the ends of the pointers so as to provide indications of the adjusted positions of the arms and to enable these positions to be reproduced if necessary.

7 Claims, 5 Drawing Figures

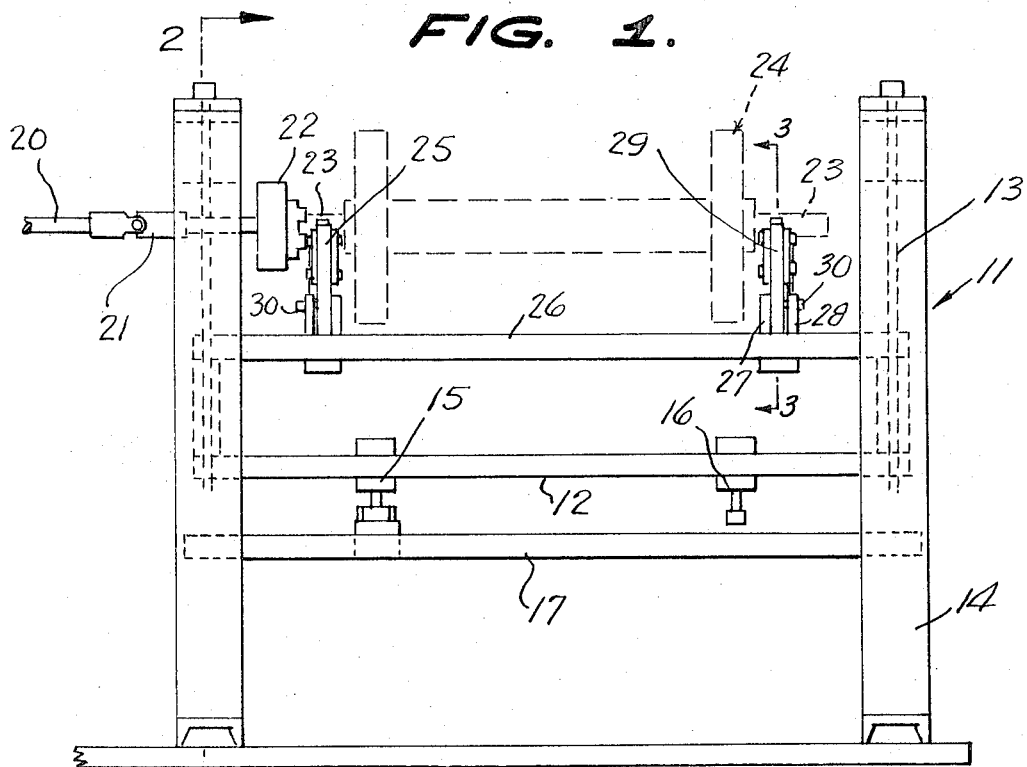
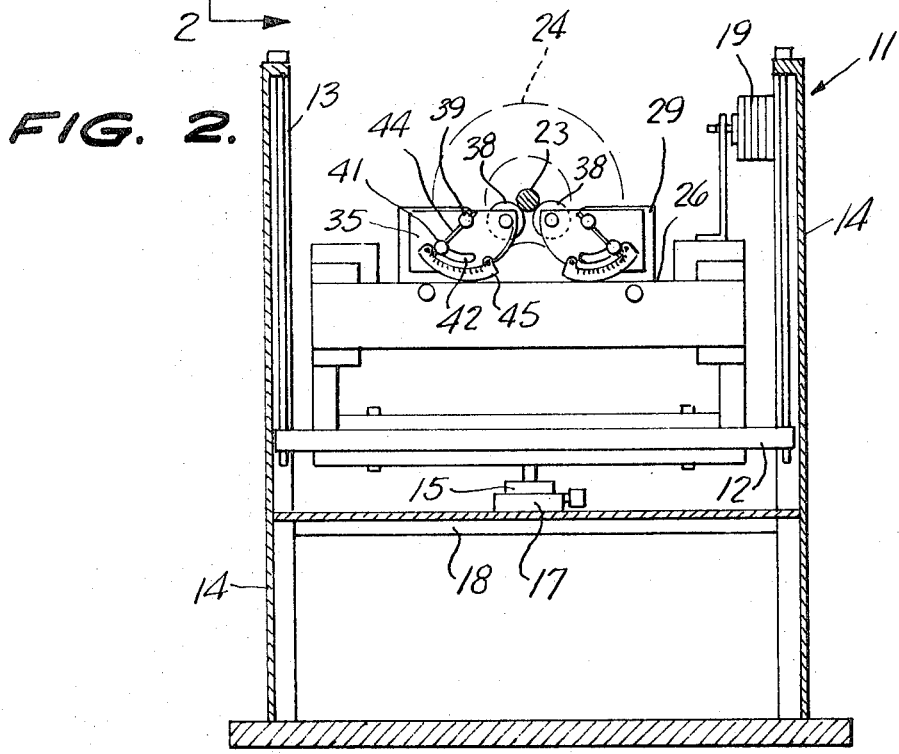

ADJUSTABLE BALL BEARING ASSEMBLY FOR DYNAMIC BALANCING MACHINES

This invention relates to dynamic balancing devices, and more particularly to improved bearing assemblies for objects being tested for dynamic balance in such devices.

A main object of the invention is to provide a novel and improved bearing assembly for a device being tested for dynamic balance in a dynamic balancing machine, the bearing assembly being relatively simple in construction, being especially adapted for use with relatively heavy wheel and axle assemblies or other devices being tested for dynamic balance, and being accurately adjustable so as to be useable with shafts or other portions of a device undergoing tests over a wide range of sizes.

A further object of the invention is to provide an improved bearing assembly for a wheel and axle or other object undergoing tests for dynamic balance in a dynamic balancing machine, the assembly involving inexpensive components, being durable in construction, being easy to adjust, and being provided with highly accurate adjustment indicating means so that the adjustments may be accurately reproduced whenever necessary.

A still further object of the invention is to provide an improved bearing assembly for an object undergoing tests for dynamic balancing in a dynamic balancing machine, the bearing assembly providing minimum friction of the rotating object being tested for dynamic balance, accurately maintaining it in alignment, and minimizing the amount of power required to drive the object.

A still further object of the invention is to provide an improved shaft bearing assembly for rotatably supporting an object undergoing tests in a dynamic balancing machine, the assembly being provided with independently adjustable opposing support arm elements provided with supporting rollers and having means for securely clamping the arms in adjusted positions, as well as means to indicate the exact positions of adjustment of the respective supporting arms.

Further objects and advantages of the invention will become apparent from the following description and claims, and from the accompanying drawings, wherein:

FIG. 1 is an elevational view of a dynamic balancing machine provided with improved shaft bearing assemblies according to the present invention for supporting a wheel and axle under tests for dynamic balance.

FIG. 2 is a transverse vertical cross-sectional view taken substantially on the line 2—2 of FIG. 1.

Figure 3:
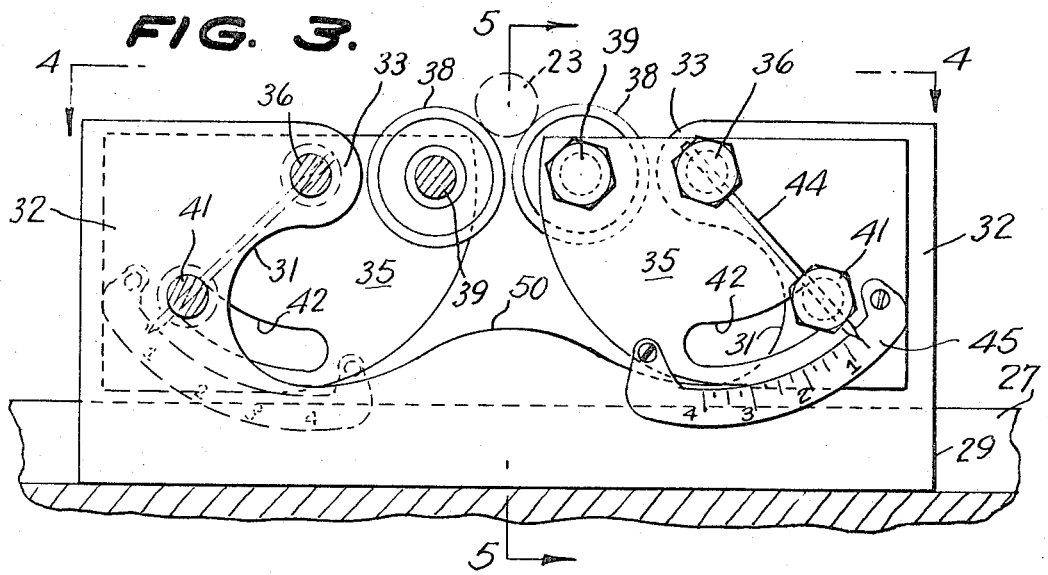
FIG. 3 is an enlarged fragmentary transverse vertical cross-sectional view taken substantially on the line 3—3 of FIG. 4.
Figure 4:
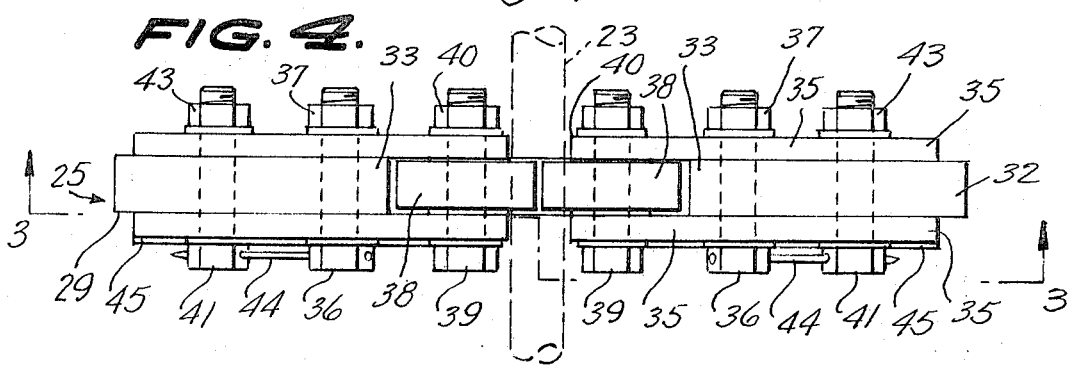
FIG. 4 is a top plan view taken substantially on the line 4—4 of FIG. 3.

Referring to the drawings, 11 generally designates a dynamic balancing machine, for example, a dynamic balancing machine of the type described in applicant's previously filed application, Ser. No. 63,807, entitled Gyroscopic-Action Dynamic Balancer, filed Aug. 14, 1970. This type of machine employs a generally rectangular frame assembly 12 which is supported at its corners by flexible cable elements 13 attached at their lower ends to the corner portions of the frame assembly 12 and supportingly engaged at their top ends with the top ends of respective corner posts 14, whereby the frame assembly 12 is movable relative to the corner posts 14 substantially in a horizontal direction. The frame assembly 12 may be constrained to pivot horizontally at either of two vertical pivot assemblies 15 and 16 located adjacent the opposite ends of the machine and being adjustable along a longitudinal track assembly 17 which is rigidly secured at its opposite ends to transverse cross bars 18 connecting the opposite pairs of upstanding vertical end posts 14. Suitable transducer means 19 are provided for detecting the horizontal movements of the frame assembly 12 in conjunction with associated indicating circuit means, as described in the above-mentioned previously filed patent application.

The dynamic balancing machine 11 is provided with a power input shaft 20 connected by a universal joint assembly 21 to a driving chuck assembly 22 which may be suitably coupled to one end shaft element 23 of an object being tested for balance, for example, a wheel and axle assembly 24.

The respective opposite end shaft elements 23, 23 of the wheel and axle assembly 24 are rotatably supported on the floating frame assembly 12 by means of improved shaft bearing assemblies constructed in accordance with the present invention.

Figure 5:
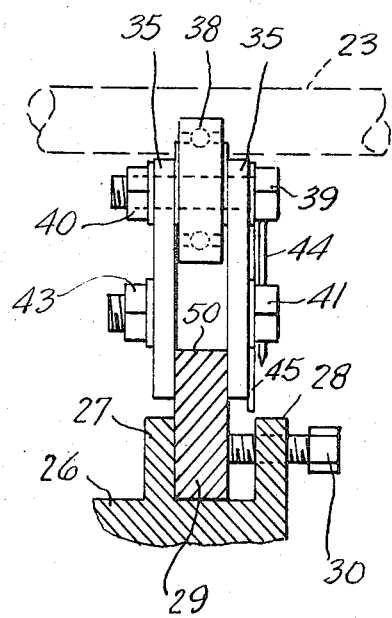
FIG. 5 is an enlarged transverse median vertical cross-sectional view taken substantially on the line 5—5 of FIG. 3.

The horizontally movable frame assembly 12 has a top horizontal panel portion 26 on which are secured respective transversely extending pairs of upstanding bars 27 and 28 located adjacent the respective opposite ends of the platform element 26, and clampingly secured between said pairs of bars 27 and 28 are respective transversely extending vertical blocks 29, the blocks 29 being clampingly secured between the bars 27 and 28, for example, by horizontal clamping screws 30 threadedly engaged through the bars 28 and clamping the blocks 29 against the opposing bars 27, as shown in FIG. 5. Thus, the blocks 29 may be secured beneath the respective opposite end shaft portions 23, 23 of a wheel and axle assembly 24 to be tested for dynamic balance.

Each block 29 is formed with an upwardly facing central notch 50 which is undercut at its opposite end portions, as shown at 31, 31, thereby defining opposite upstanding end arms 32, 32 having inwardly projecting top lug portions 33, 33. Respective pairs of swingable arms 35, 35 are pivotally connected to the lugs 33 and disposed on opposite sides thereof, as by transverse headed pivot bolts 36, 36, the bolts being provided with retaining nuts 37. The arms 35, 35 have upper inner corner portions between which are journaled respective supporting rollers 38, 38, said rollers being journaled by ball bearings on transverse bolts 39 extending through the upper inner corner portions of the arms 35 and being provided with retaining nuts 40.

The arms 35 are clampingly secured in adjusted positions such that the rollers 38 supportingly underlie the shaft ends 23 by means of respective transverse clamping bolts 41, 41 extending through parallel arcuate paths of slots 42 formed in the respective pairs of arms and through the intervening associated upstanding end arm portions 32 of block 29. The clamping bolts 41 are provided with clamping nuts 43. The arcuate slots 42 are concentric with the pivot bolts 36 and are of sufficient length to provide a substantial range of angular adjustment of the arms 35, 35, sufficient to accommodate the rollers 38, 38 to various sizes of shaft elements 23, required to be supportingly engaged by the rollers.

Engaged diametrically through the heads of the bolts 39 and 41 adjacent each end of the bearing assembly is a stationary pointer rod 44 whose lower end portion extends adjacent an arcuate scale plate 45 secured to the associated arm 35 below and parallel to the slot 42 thereof, the scale plate 45 being provided with a numerical scale which may be moved relative to the end of the pointer rod 44 and which serves to indicate the specific position of adjustment of the associated pairs of arms 35, 35. Thus, the adjustment can be made by loosening the nuts 37 and 43, pivoting the associated arms 35, 35 to the desired position of its roller 38, and then tightening the nuts 37 and 43, thereby locking the associated pair of arms 35, 35 in the desired position, said position being precisely indicated by the associated stationary pointer rod 44 with respect to its associated scale plate 45. The respective pairs of arms 35, 35 may be individually adjusted, and the adjusted position of each pair of arms will be indicated on its associated scale plate 45 by the position of its associated pointer 44 along the scale of said scale plate. Thus, the positions of the respective pairs of arms 35, 35 for a particular test can be recorded and if necessary, such positions can be accurately reproduced at some future time, for example, when it is again desired to test the same assembly 24 for balance on the machine.

It will be noted that the arrangement above described allows for independent and accurately reproducible adjustment of the positions of the respective cooperating bearing rollers 38, 38 so that accurate alignment between the axis of the shaft elements 23 and the axis of the driving shaft connected to the universal joint 21 can be maintained. The provision of the numerical scales on the scale plates 45 provides a means for recording the respective individual adjustments and enables these adjustments to be accurately reproduced when required.

The rollers 38, 38 can be adjusted over a substantial range of spacing therebetween, thereby providing for the support of shaft elements 23, 23 over a relatively wide range of sizes.

While a specific embodiment of an improved bearing assembly for balancing machines has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a balancing machine, a support, platform means, means supportingly connecting said platform means to said support for free horizontal movement relative to said support, and a plurality of spaced aligned bearing assemblies on said platform means to support a rotating object to be balanced, each bearing assembly comprising upstanding transverse bracket means secured on said platform means, a pair of lever arms, means pivotally connecting intermediate portions of said lever arms to said bracket means for pivoting in transverse planes, respective transverse bearing rollers journaled on the inner ends of said lever arms, and means to independently adjustably secure the outer end portions of said lever arms to said bracket means for adjusting the spacing between said bearing rollers, said lever arms being formed with arcuate slots concentric with the pivot connections of the lever arms and said securing means comprising respective transverse headed clamping bolts extending through the upstanding bracket means and through said slots.

2. The balancing machine of claim 1, and arcuate position indicating scale means on the lever arms extending substantially parallel to said slots.

3. The balancing machine of claim 2, and radial pointer rod means connecting the clamping bolts to the pivot connections of the lever arms and extending adjacent said indicating scale means.

4. The balancing machine of claim 3, and wherein said upstanding bracket means comprises a transverse plate member formed with a central notch having undercut end portions defining opposing inwardly projecting lugs, the intermediate portions of the lever arms being pivotally connected to said lugs.

5. The balancing machine of claim 4, and wherein the means pivotally connecting the intermediate portions of the lever arms to said lugs comprises respective headed pivot bolts extending transversely through the lever arms and the lugs.

6. The balancing machine of claim 5, and wherein said pointer means comprises respective pointer rods extending diametrically through the head portions of the pivot bolts and the clamping bolts.

7. The balancing machine of claim 6, and wherein said position-indicating scale means comprises respective arcuate plate members secured on the lever arms adjacent the arcuate slots and having numerical scales thereon, the ends of the pointer rods extending over said numerical scales.

* * * * *